May 26, 1942.  G. L. KELLY  2,284,214
TIMBER COUPLING
Filed July 21, 1939

Inventor
GEORGE L. KELLY
By E. V. Hardway,
Attorney

Patented May 26, 1942

2,284,214

UNITED STATES PATENT OFFICE 2,284,214

TIMBER COUPLING

George L. Kelly, Houston, Tex.

Application July 21, 1939, Serial No. 285,729

2 Claims. (Cl. 20—92)

This invention relates to a timber coupling.

An object of the invention is to provide a coupling of the character described specially designed for coupling together timbers which are subjected to unusual stresses and which will relieve the fastener, or fasteners, of the timbers of a major portion of the stress to which the timbers are subjected.

It is another object of the invention to provide a coupling specially designed for coupling together, or connecting, timbers which are subjected to tensile stress.

It is a further object of the invention to provide a coupling disc having marginal flanges on opposite sides thereof adapted to be seated in registering grooves in the adjacent sides of the timbers whereby the flanges will apply the stresses between the coupling and the timber at the points of greatest resistance of the wood to said stresses and whereby in the event of excessive or unusual stress a portion, only, of the load may be assumed by the connecting bolt connecting the timbers and extending through the coupling.

With the above and other objects in view the invention has particular relation to certain novel features of construction, arrangement of parts and use, an example of which is given in this specification and illustrated in the accompanying drawing, wherein—

Figure 1:
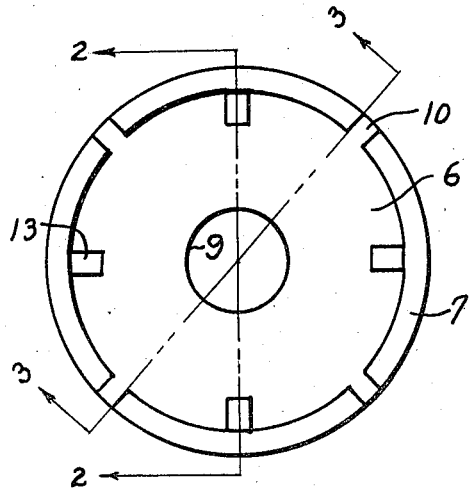
Figure 1 shows a plan view of the coupling.
Figure 2:
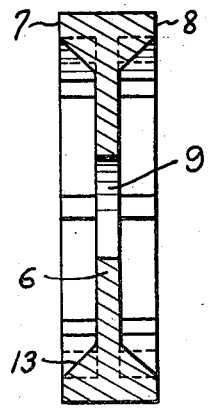
Figure 2 shows a sectional view taken on the line 2—2 of Figure 1.

Referring now more particularly to the drawing wherein like numerals of reference designate the same parts of each of the figures, the numerals 1, 2 designate the timbers whose connected ends overlap and are secured together by means of a bolt 3 having the enlarged head 4 at one end and the nut 5 screwed onto the other end. The coupling is in the form of a metal disc 6, preferably circular in shape and having the marginal flanges 7, 8, one on each side, approximately perpendicular to the plane of the disc. The disc 6 has a central opening 9 to receive the bolt 3 rather snugly. The flanges 7, 8 may, if desired, be provided with the spaced notches 10.

Figure 3:
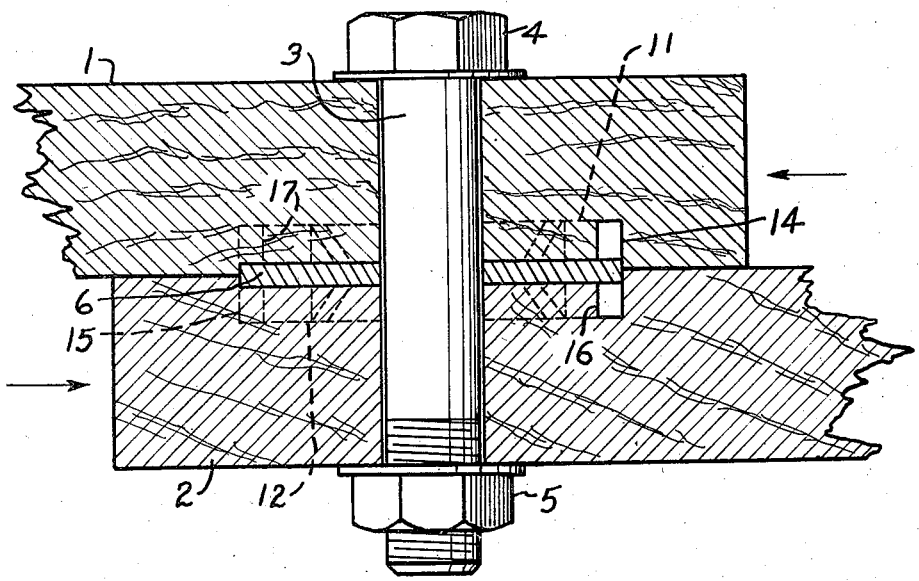
Figure 3 shows a sectional view of the connected timbers showing the coupling in section on the line 3—3 of Figure 1.

As clearly illustrated in Figure 3 the adjacent sides of the connected timbers have the circular grooves 11, 12 to receive the corresponding flanges 7, 8 and within said grooves the timbers are countersunk to provide space to receive the disc 6, as shown in Figure 3. If desired the flanges 7, 8 may be reinforced by the inside fillets, or braces, 13 formed integrally with the flanges and with the disc. The stresses will be applied in the direction indicated by the arrows in Figure 3. The points of greatest stresses between the flanges and the wood will be at the points 14, 15, 16, 17 and in the direction of said respective arrows thus normally relieving the bolt 3 of any strain or stress tending to shear or break the same, however, should the material of one of the timbers be of less resistance to the stress than the material of the other timber thus causing a relative movement of the coupling with respect to one of said timbers the bolt 3 will assume a part of the load, which will ordinarily not be sufficient to shear or break the bolt.

The drawing and description are illustrative merely, while the broad principle of the invention will be defined by the appended claims.

What I claim is:

1. A timber coupling comprising a metal disc having a central bolt aperture and outstanding marginal flanges, one on each side of the disc, inside relatively narrow fillets, forming braces integral with the disc and the respective flanges and located midway between the notches.

2. A timber coupling comprising a metal disc having a central bolt aperture and outstanding marginal flanges, one on each side of the disc, said flanges having spaced notches, inside, relatively narrows fillets formed integral with the disc and the respective flanges, said fillets being located centrally relative to the notches to provide braces for said flanges between the notches, and forming projections to easily penetrate into the connected timbers and to prevent rotation of the coupling.

GEORGE L. KELLY.